(12) United States Patent
Yui et al.

(10) Patent No.: US 10,865,881 B2
(45) Date of Patent: Dec. 15, 2020

(54) GASKET AND METHOD FOR MOUNTING SAME

(71) Applicant: NOK CORPORATION, Tokyo (JP)

(72) Inventors: Hajime Yui, Fujisawa (JP); Kenichi Oba, Fujisawa (JP); Takuro Nishimura, Fujisawa (JP)

(73) Assignee: NOK CORPORATION

( * ) Notice: Subject to any disclaimer, the term of this patent is extended or adjusted under 35 U.S.C. 154(b) by 120 days.

(21) Appl. No.: 16/095,635

(22) PCT Filed: Mar. 30, 2017

(86) PCT No.: PCT/JP2017/013166
§ 371 (c)(1),
(2) Date: Oct. 22, 2018

(87) PCT Pub. No.: WO2017/195489
PCT Pub. Date: Nov. 16, 2017

(65) Prior Publication Data
US 2019/0128423 A1   May 2, 2019

(30) Foreign Application Priority Data
May 10, 2016   (JP) ................................. 2016-094415

(51) Int. Cl.
*F16J 15/10*   (2006.01)
*F16J 15/06*   (2006.01)
(Continued)

(52) U.S. Cl.
CPC ........... *F16J 15/102* (2013.01); *F16J 15/022* (2013.01); *F16J 15/061* (2013.01); *F16J 15/104* (2013.01);
(Continued)

(58) Field of Classification Search
CPC .......... F16J 15/102; F16J 15/10; F16J 15/104; F16J 15/022; F16J 15/02; F16J 15/46;
(Continued)

(56) References Cited

U.S. PATENT DOCUMENTS 5,564,714 A * 10/1996 Katsuno .............. B25B 27/0028
277/630
7,741,394 B2 * 6/2010 Hakuta ................ C08K 5/5419
524/266

(Continued)

FOREIGN PATENT DOCUMENTS

| CN | 101156267 A | 4/2008 |
|---|---|---|
| CN | 101213251 A | 7/2008 |

(Continued)

OTHER PUBLICATIONS

Extended European Search Report for Application No. EP 17 795 850 dated May 3, 2019 (8 pages).

*Primary Examiner* — Nathan Cumar
(74) *Attorney, Agent, or Firm* — Harness, Dickey & Pierce, P.L.C.

(57) ABSTRACT

A gasket is provided which is configured so that a gasket body is easily separated from a carrier film and the positional shift of the gasket body in stacking can be prevented. The gasket has a combination of a gasket body which contains only a rubber-like elastic body and which, in order to seal a gap between one member and the other member, is mounted in the other member and a carrier film separably stuck to one surface side in the thickness direction of the gasket body, in which an engagement portion is formed in the other surface in the thickness direction of the gasket body at a position corresponding to a portion to be engaged formed in the other member, and the gasket body is mounted in the other member by engagement of the engagement portion and the portion to be engaged.

6 Claims, 8 Drawing Sheets

(51) Int. Cl.
*F16J 15/02* (2006.01)
*H01M 8/0276* (2016.01)
*H01M 8/0271* (2016.01)
*B29L 31/26* (2006.01)

(52) U.S. Cl.
CPC .......... *F16J 15/106* (2013.01); *F16J 15/108* (2013.01); *H01M 8/0276* (2013.01); *B29L 2031/265* (2013.01); *B32B 2581/00* (2013.01); *H01M 8/0271* (2013.01)

(58) Field of Classification Search
CPC   F16J 15/48; F16J 15/027; F16J 15/061; F16J 15/06; F16J 15/0831; F16J 15/106; F16J 15/108; H01M 8/0276; H01M 8/0273; H01M 8/0271; B29L 2031/265; B29L 2031/26; B29L 2031/00
USPC ......................................................... 277/650
See application file for complete search history.

(56) References Cited

U.S. PATENT DOCUMENTS

| | | | | |
|---|---|---|---|---|
| 8,084,165 | B2* | 12/2011 | Kusakabe | H01M 8/0273 429/508 |
| 2007/0298272 | A1* | 12/2007 | Kusakawa | B29C 45/14336 428/515 |
| 2009/0118404 | A1* | 5/2009 | Hakuta | C08K 5/5419 524/266 |
| 2009/0136811 | A1* | 5/2009 | Kusakabe | H01M 8/0273 429/492 |
| 2013/0052565 | A1* | 2/2013 | Ridgeway | H01M 8/0284 429/516 |

FOREIGN PATENT DOCUMENTS

| | | |
|---|---|---|
| JP | 2005-003181 A | 1/2005 |
| JP | 5293949 B2 | 9/2013 |
| JP | 5385051 B2 | 1/2014 |
| JP | 2014-060133 A | 4/2014 |
| JP | 5743413 B2 | 7/2015 |
| WO | WO-2008-126618 A1 | 10/2008 |
| WO | WO-2015-052980 A1 | 4/2015 |

\* cited by examiner

GASKET AND METHOD FOR MOUNTING SAME

CROSS-REFERENCE TO RELATED APPLICATIONS

This application is a U.S. National Stage Application of International Application No. PCT/JP2017/013166, filed on Mar. 30, 2017, and published in Japanese as WO 2017/195489 A1 on Nov. 16, 2017 and claims priority to Japanese Application No. 2016-094415, filed on May 10, 2016. The entire disclosures of the above applications are incorporated herein by reference.

TECHNICAL FIELD

The present invention relates to a gasket relating to a sealing technique and more specifically relates to a gasket with a carrier film containing a combination of a gasket body containing a rubber-like elastic body and the carrier film holding the gasket body and a method for mounting the same. The gasket of the present invention is used as a fuel cell gasket, for example, or used as a general gasket for the other applications.

RELATED ART

As the fuel cell gasket, gaskets of various configurations, such as a rubber-only gasket containing a rubber-like elastic body, a separator-integrated gasket in which a gasket containing a rubber-like elastic body is integrally molded in a separator, and a GDL-integrated gasket in which a gasket containing a rubber-like elastic body is integrally molded in a GDL (gas diffusion layer), are mentioned.

These gaskets each have features. In recent years, a demand for a cost reduction is strong, and therefore the rubber-only gasket capable of satisfying the demand has drawn attention. As the rubber-only gasket, one illustrated in FIG. 6 is known, for example.

A rubber-only gasket (hereinafter also simply referred to as gasket) 510 illustrated in FIG. 6a forms a planar shape (plate shape) as a whole, in which an outer peripheral seal portion 521 for sealing the periphery of a reaction surface of a fuel cell over the entire periphery is provided in a planar rectangular frame shape and inside seal portions (seal portion for manifolds) 522 are integrally provided in both ends in the longitudinal direction of the outer peripheral seal portion 521 in order to seal the periphery of manifolds. The cross-sectional shape of the gasket 510 forms a circular cross-sectional shape as illustrated in FIG. 6b.

However, the rubber-only gasket 510 described above has room for further improvement in the following respects.

More specifically, since the cross-sectional shape (wire diameter) of the gasket 510 is generally set to be small, e.g., about 1 mm or several millimeters, a twist is likely to occur in the gasket 510 during conveyance or in stacking, and thus the workability (handling properties) thereof is not good.

Therefore, the gasket 510 with a carrier film (hereinafter also simply referred to as gasket) containing a combination of a gasket body 520 containing a rubber-like elastic body and a carrier film 530 separably stuck to the lower side of FIG. 7b in the gasket body 520 as illustrated in FIG. 7a has been proposed. In the gasket 510 with the carrier film, the gasket body 520 containing a rubber-like elastic body is held by the carrier film 530 having strength higher than that of the gasket body 520, and therefore a twist is hard to occur and the workability can be improved.

The gasket 510 is set in an adsorption portion 552 of an evacuation device 551 with the carrier film 530 as a base as illustrated in FIG. 8a, the gasket body 520 is removed from the carrier film 530 using a suction jig 553 or the like exhibiting sucking force in a direction indicated by an arrow M as illustrated in FIG. 8b while performing evacuation in a direction indicated by an arrow S of FIG. 8a to thereby adsorb (fix) the carrier film 530, and then only the removed gasket body 520 is mounted in a separator (not illustrated), for example.

However, the gasket body 520 has adhesiveness on the surface due to the characteristics thereof, and therefore, when the gasket body 520 is stuck to the carrier film 530, the carrier film 530 needs to be separated with strong force from the gasket body 520 in the above-described removal of the gasket body 520, and thus there is room for further improvement in the respect of easy separability.

Moreover, when the carrier film 530 is separated from the gasket body 520, the carrier film 530 cannot hold the gasket body 520. Therefore, as in the rubber-only gasket illustrated in FIGS. 6a and 6b, a twist is likely to occur in the gasket body 520, and there is room for further improvement in the respect that the gasket body 520 is continuously mounted at the original position in stacking.

The present invention has been made in view of the above-described respects. It is a technical problem to be solved to provide a gasket which is configured so that a gasket body is easily separated from a carrier film and the positional shift of the gasket body in stacking can be prevented.

SUMMARY

As a means for effectively solving the technical problem to be solved described above, a gasket of the present invention has a combination of a gasket body which contains only a rubber-like elastic body and which, in order to seal a gap between one member and the other member, is mounted in the other member and a carrier film separably stuck to one surface side in the thickness direction of the gasket body, in which, an engagement portion is formed in the other surface in the thickness direction of the gasket body at a position corresponding to a portion to be engaged formed in the other member and the gasket body is mounted in the other member by engagement of the engagement portion and the portion to be engaged.

The engagement portion may be formed over the entire periphery of the gasket body.

Two or more of the engagement portions may be formed at predetermined intervals in the gasket body.

The engagement portion in the gasket body may form a recessed shape and the portion to be engaged in the other member may form a projection shape.

The gasket may be mounted in the other member by engaging the engagement portion in the gasket body with the portion to be engaged formed in the other member, and then separating the carrier film stuck to the gasket body.

EFFECT OF THE INVENTION

According to the gasket of the above-described configuration, the gasket body is mounted in the other member by the engagement of the engagement portion provided in the other surface in the thickness direction of the gasket body with the portion to be engaged formed in the other member. Therefore, after mounting the gasket body, the carrier film can be easily separated from the gasket body. Moreover, since the gasket body is engaged with the other member, the positional shift of the gasket in stacking does not occur.

BRIEF DESCRIPTION OF THE DRAWINGS

FIGS. 1a and 1b are views illustrating a gasket according to an embodiment of the present invention, in which FIG. 1a is a plan view thereof and FIG. 1b is a cross-sectional view along the A-A line of FIG. 1a.

FIGS. 3a and 3b are explanatory views illustrating a method for mounting the gasket according to the embodiment of the present invention, in which FIG. 3a is a view illustrating a state where the gasket is fixed to the separator and FIG. 3b is a view illustrating a state where a carrier film is separated from a gasket body.

FIGS. 4a and 4b are views illustrating an example of recessed portions in the gasket according to the embodiment of the present invention, in which FIG. 4a is a plan view thereof and FIG. 4b is an enlarged plan view of a P portion in FIG. 4a.

FIGS. 5a and 5b are views illustrating another example of recessed portions in the gasket according to the embodiment of the present invention, in which FIG. 5a is a plan view thereof and FIG. 5b is an enlarged plan view of a Q portion in FIG. 5a.

FIGS. 6a and 6b are views illustrating a gasket according to a conventional technique, in which FIG. 6a is a plan view thereof and FIG. 6b is a cross-sectional view along the B-B line of FIG. 6a.

FIGS. 7a and 7b are views illustrating a gasket according to a reference example, in which FIG. 7a is a plan view thereof and FIG. 7b is a cross-sectional view along the C-C line of FIG. 7a.

DETAILED DESCRIPTION

Figure 1A:
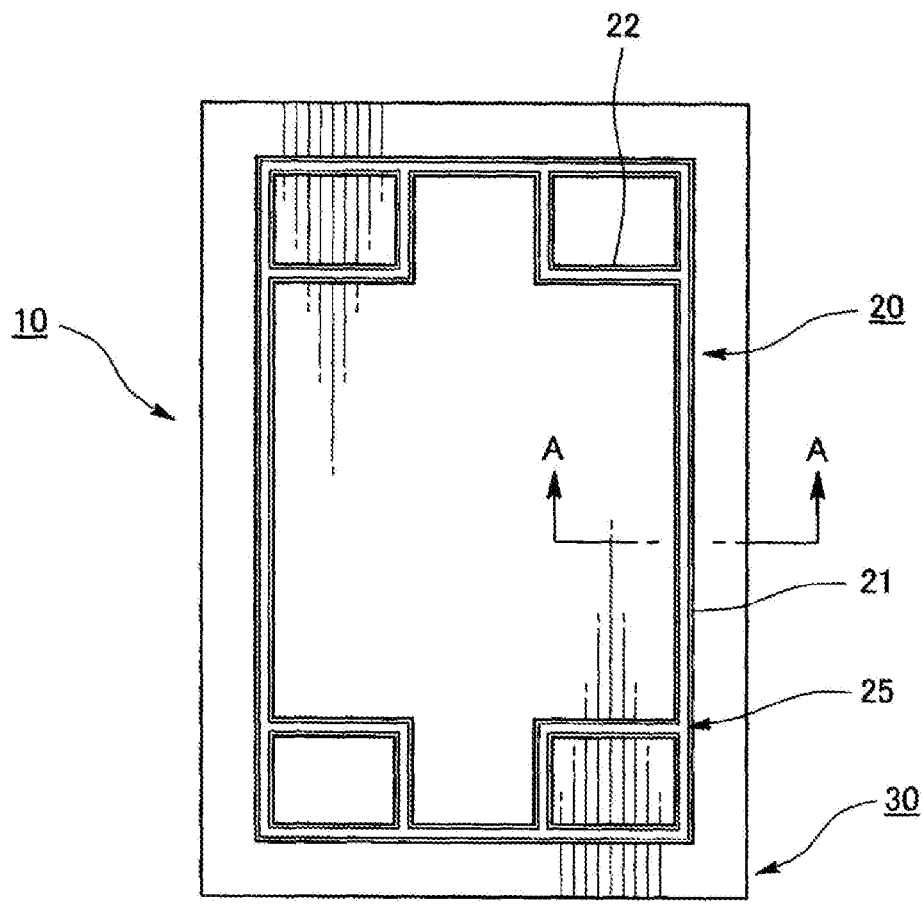
Figure 1B:
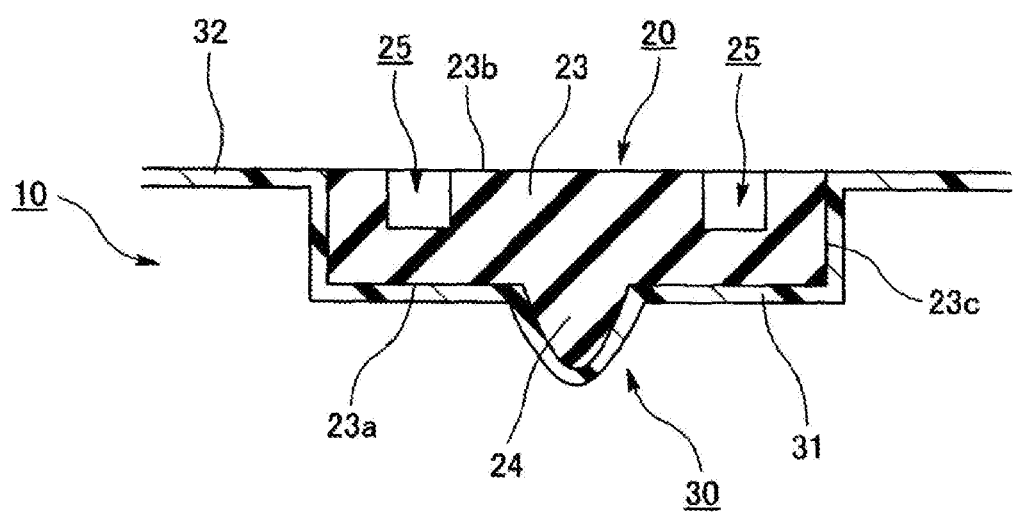
Figure 2:
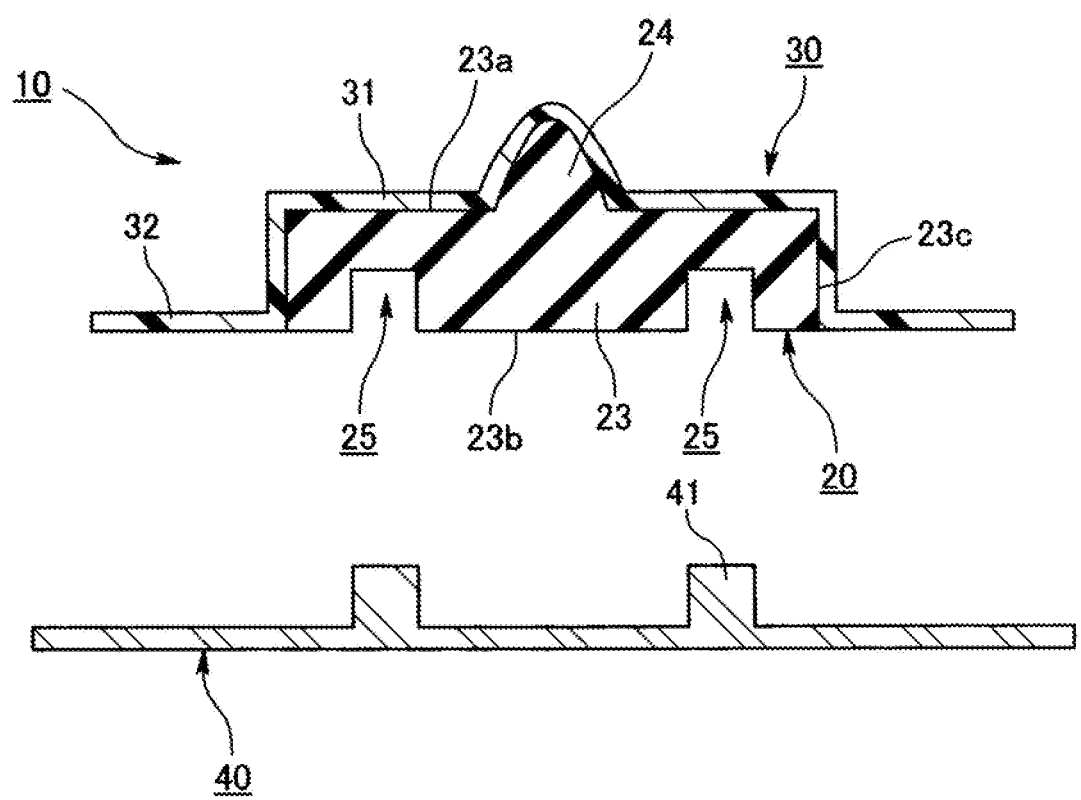
FIG. 2 is an enlarged cross-sectional view of a principal portion illustrating the gasket according to the embodiment of the present invention and a separator in which the gasket is mounted.

Hereinafter, a gasket 10 according to this embodiment is described in detail with reference to the drawings. FIGS. 1a and 1b are views illustrating the gasket 10 according to the embodiment of the present invention, in which FIG. 1a is a plan view thereof and FIG. 1b is a cross-sectional view along the A-A line of FIG. 1a. FIG. 2 is an enlarged cross-sectional view of a principal portion illustrating the gasket 10 according to the embodiment of the present invention and a separator 40 in which the gasket 10 is mounted.

As illustrated in FIGS. 1a and 1b and FIG. 2, the gasket 10 according to this embodiment contains a combination of a gasket body 20 containing a required rubber-like elastic body (for example, VMQ, PIB, EPDM, FKM, and the like) and assembled onto the plane of the separator 40 for fuel cells which is a kind of a plate and a carrier film 30 containing a resin film separably stuck to the gasket body 20.

The gasket body 20 is molded into a planar shape (plate shape) as a whole. An outer peripheral seal portion 21 sealing the periphery of the reaction surface of a fuel cell over the entire periphery is provided in a planar rectangular frame shape. Moreover, in order to divide the reaction surface of a fuel cell and each manifold portion, inside seal portions (seal portion for manifolds) 22 are integrally provided in both end portions in the longitudinal direction of the outer peripheral seal portion 21. As the cross-sectional shape of the gasket body 20, a seal base portion 23 forming a rectangular cross-sectional shape is formed and a seal lip portion 24 having a substantially arc-shaped cross-sectional shape or a projection shape is formed in the center of one surface in the thickness direction of the seal base portion 23 as illustrated in FIG. 1b.

In the seal base portion 23, the cross section forms a rectangular shape and a carrier film 30 described later is stuck to one surface 23a side in the thickness direction and a side surface 23c of the seal base portion 23. In the other surface 23b in the thickness direction of the seal base portion 23, recessed portions 25 are formed.

The recessed portions 25 are formed into a groove shape over the entire periphery of the outer peripheral seal portion 21 and the inside seal portions 22 as illustrated in FIGS. 1a and 1b. The recessed portions 25 include two recessed portions 25 provided in parallel to each other. The recessed portions 25 are engaged with projection portions 41 formed in the separator 40 described later.

The seal lip portion 24 projects toward the one surface 23a side from the center of the seal base portion 23. To the outer surface of the seal lip portion 24, the carrier film 30 described later is stuck.

The carrier film 30 contains a resin film forming a planar rectangular shape one size larger than the entire gasket body 20. In a part on the plane of the carrier film 30, a gasket holding portion 31 holding the gasket body 20 by being stuck to the one surface 23a and the side surface 23c of the seal base portion 23 and the outer surface of the seal lip portion 24 in the gasket body 20 is provided and a carrier film piece 32 which is not stuck to the gasket body 20 is provided. As the resin film, a 0.2 mm thick polypropylene film is used, for example, and is cut into a predetermined planar shape for use. As the resin film, common resin materials other than polypropylene, such as polyethylene and polystyrene, are usable. The thickness of the film is preferably set to about 0.1 mm to 0.3 mm depending on the wire diameter or the cross-sectional shape of the gasket body 20.

The separator 40 is a conductive plate dividing the reaction surfaces of a fuel cell. In the separator 40, the projection portions 41 for engagement with the recessed portions 25 are formed over the entire periphery at positions corresponding to the recessed portions 25 formed in the other surface 23b of the seal base portion 23 of the gasket body 20 as illustrated in FIG. 1a and FIG. 2. The width (length in the horizontal direction in FIG. 2) of the projection portions 41 is set to be somewhat larger than or equal to the width of the recessed portions 25 in the gasket body 20.

For the planar shape and the arrangement of the recessed portions 25 formed in the other surface 23b of the seal base portion 23 in the gasket body 20, various aspects can be considered depending on the use conditions and the like of the gasket body 20 and the following aspects may be acceptable, for example.

Figure 4A:
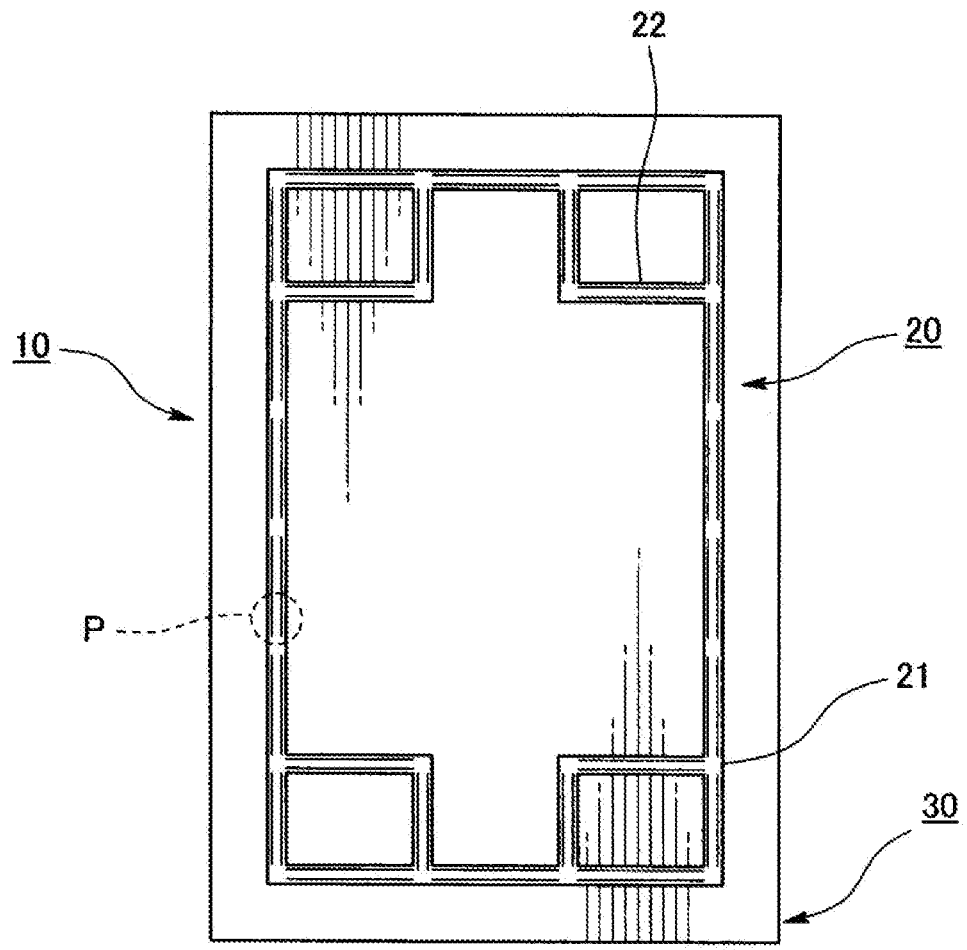
Figure 4B:
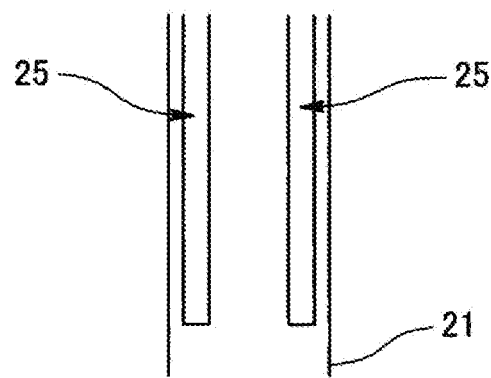

In an example illustrated in FIGS. 4a and 4b, a plurality of pairs of recessed portions 25 forming a groove shape are formed at predetermined intervals in the gasket body 20. In this case, two or more of the projection portions 41 in the separator 40 to be mounted in the gasket body 20 are also formed at predetermined intervals corresponding to the recessed portions 25 of the gasket body 20.

Figure 5A:
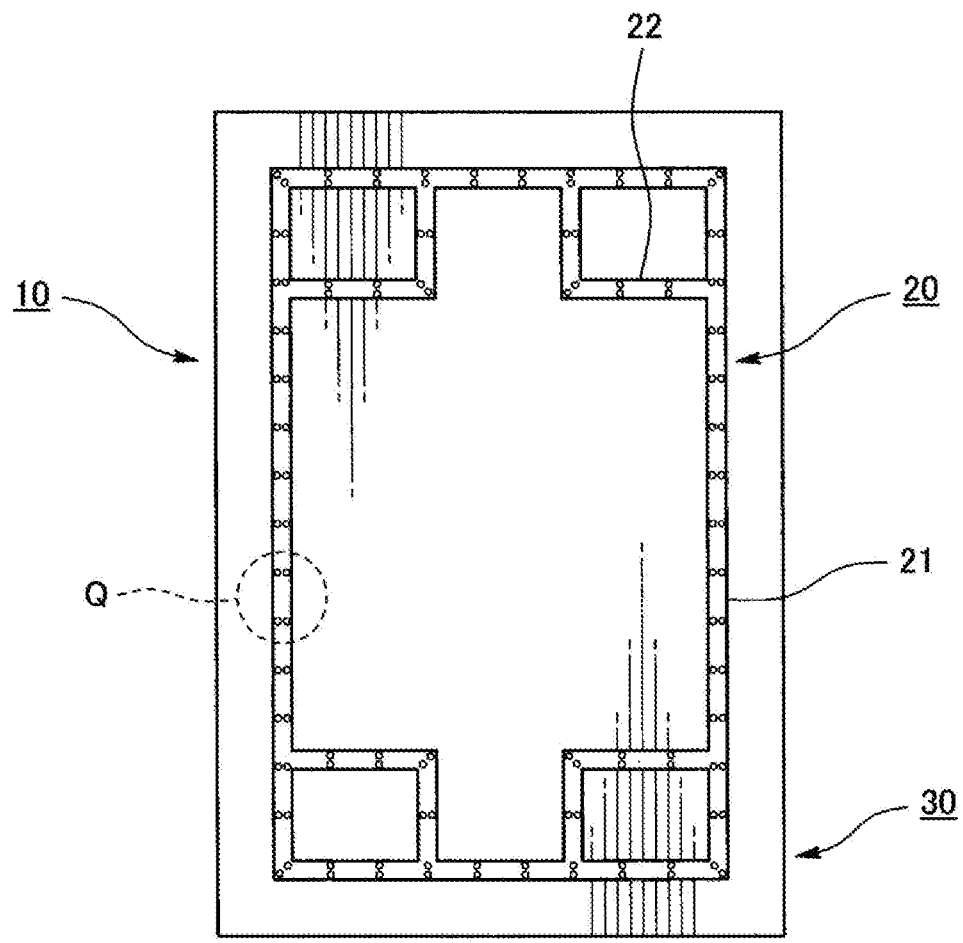
Figure 5B:
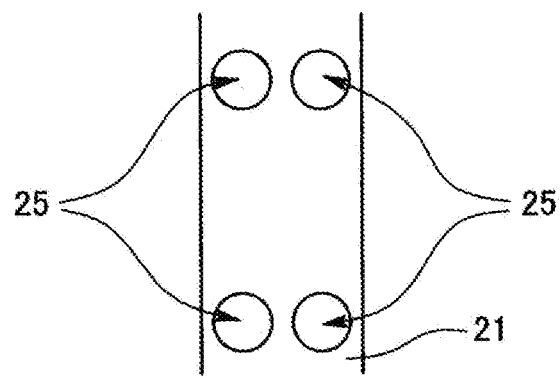
Figure 6A:
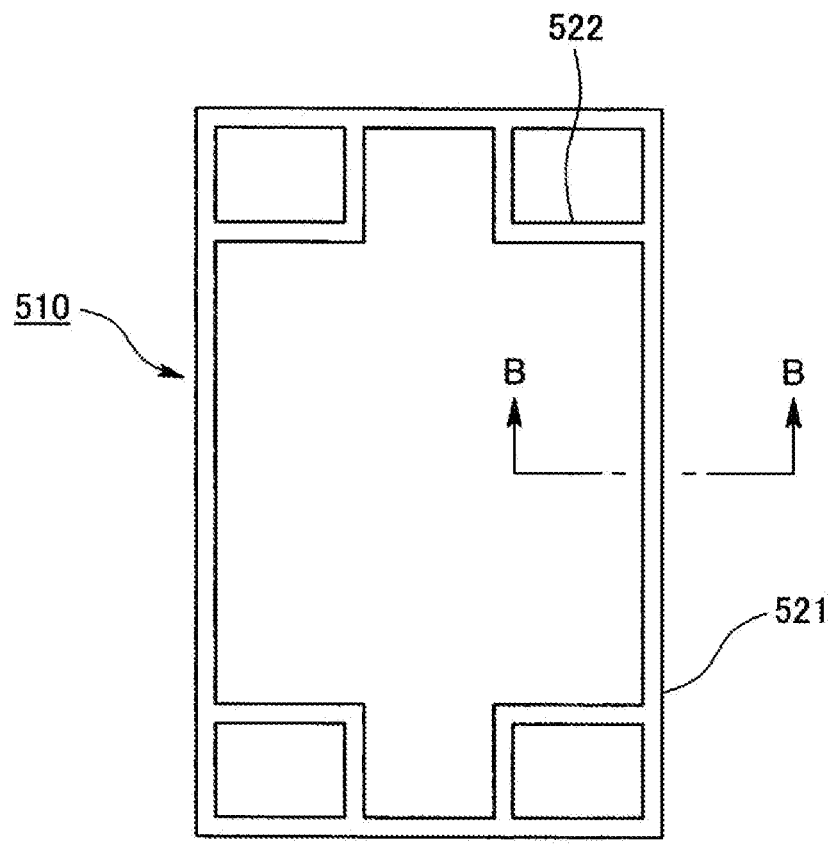
Figure 6B:
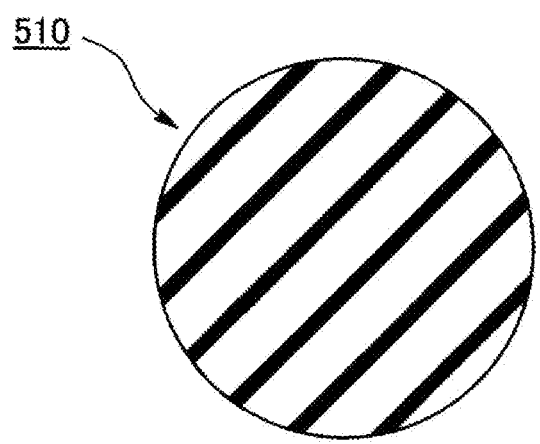
Figure 7A:
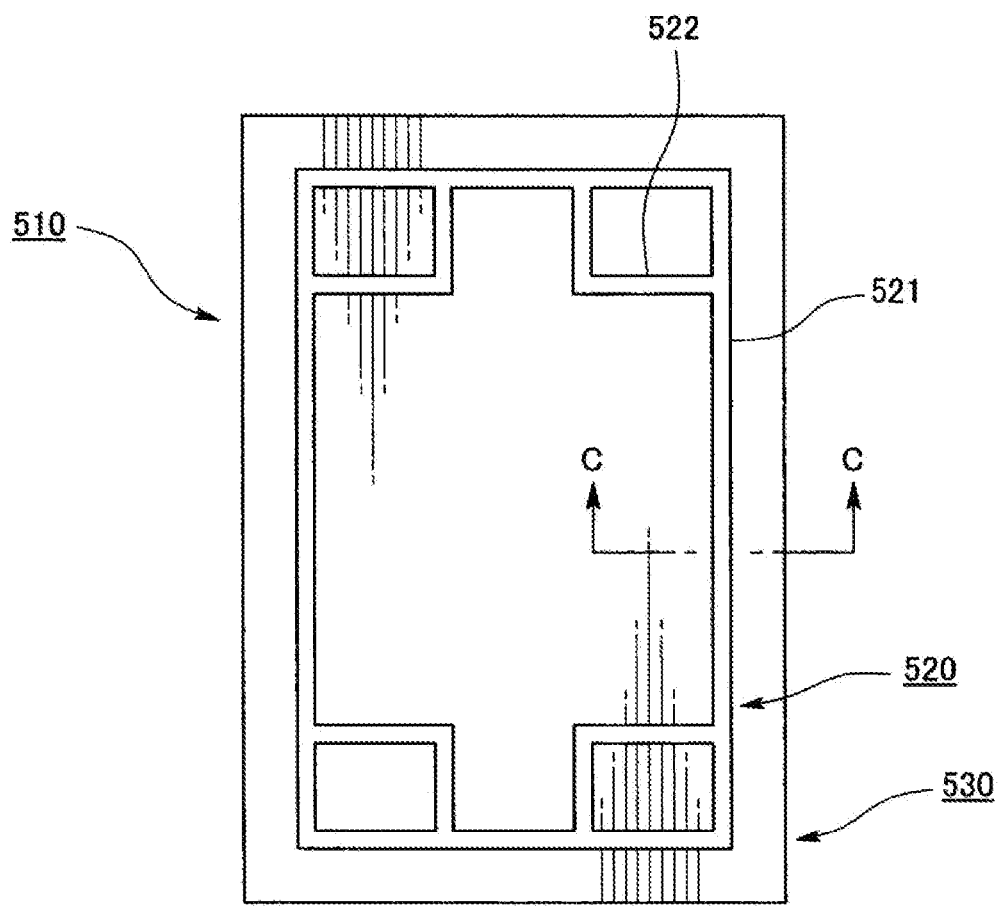
Figure 7B:
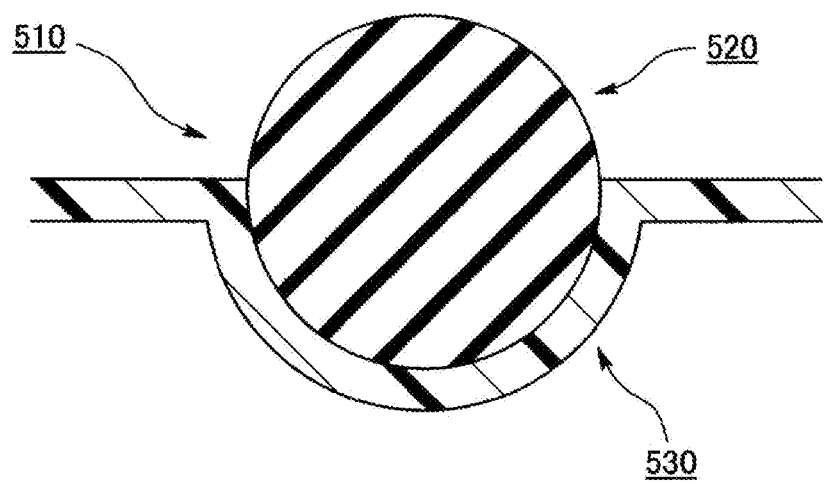
Figure 8A:
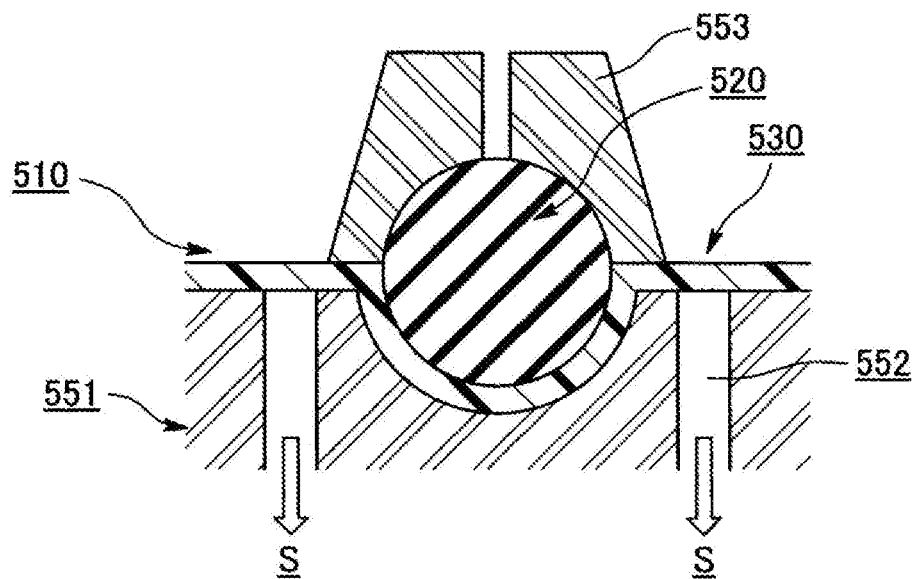
FIGS. 8a and 8b are views illustrating a state where a gasket body in the gasket according to the reference example is removed by a suction jig.
Figure 8B:
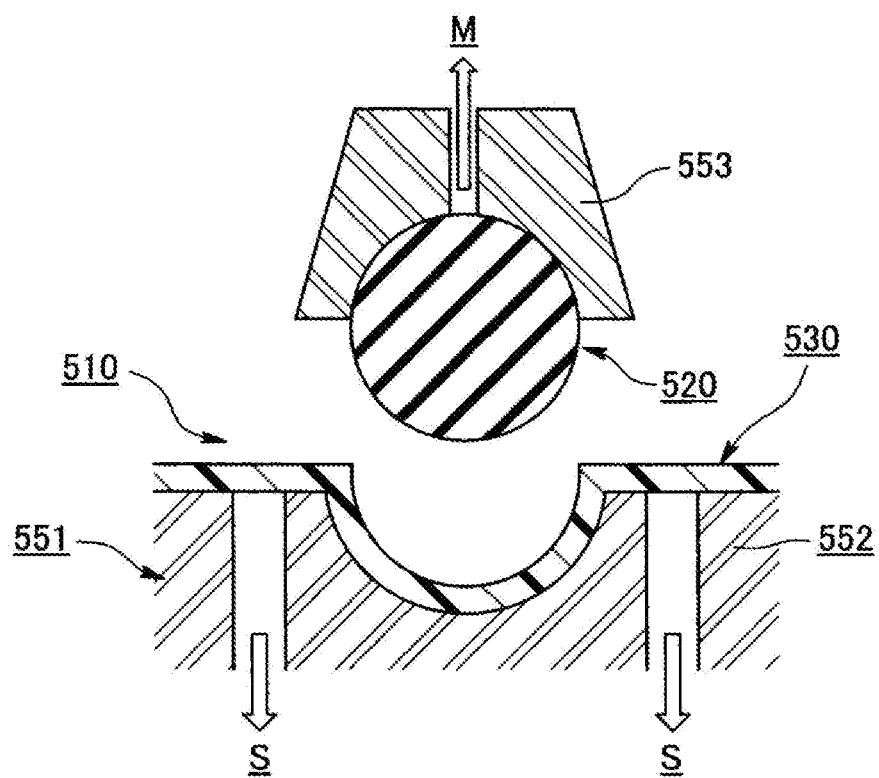

In an example illustrated in FIGS. 5a and 5b, a plurality of pairs of recessed portions 25 forming a planar circularshaped recess are formed at required intervals in the gasket body 20. In this case, two or more of the projection portions 41 in the separator 40 to be mounted in the gasket body 20 are also formed at predetermined intervals corresponding to the recessed portions 25 of the gasket body 20.

A recessed portion may be provided in the separator 40 and a projection portion may be provided in the other surface 23*b* of the seal base portion 23 in the gasket body 20.

Next, a method for producing the gasket 10 according to this embodiment is described. In the production, a die (rubber molding die) injection molding the gasket body 20 containing a rubber-like elastic body is used.

First, the carrier film 30 of a planar shape cut into a planar shape of a predetermined size is prepared, and then the carrier film 30 is mold clamped in a state of being inserted into the die (not illustrated). The die contains a combination of an upper die and a lower die. Both the dies are provided with one cavity (not illustrated) corresponding to each other. Subsequently, a molding material for molding the gasket body 20 is charged into the cavities, and then heated or the like to mold the gasket body 20. When the molding material is charged into the cavities, one part on the plane of the carrier film 30 is pressed against the inner surface of the cavity of the lower die by the molding material charging pressure to be deformed along the inner surface of the cavity (plastic deformation), so that the gasket holding portion 31 is molded. Then, after the molding of the gasket body 20, the die is opened, and then the gasket body 20 and the carrier film 30 are simultaneously removed from the die.

Thus, the gasket 10 is brought into a combined state in which the gasket body 20 is held by the carrier film 30 and products are conveyed, stored, and the like in the combined state.

Figure 3A:
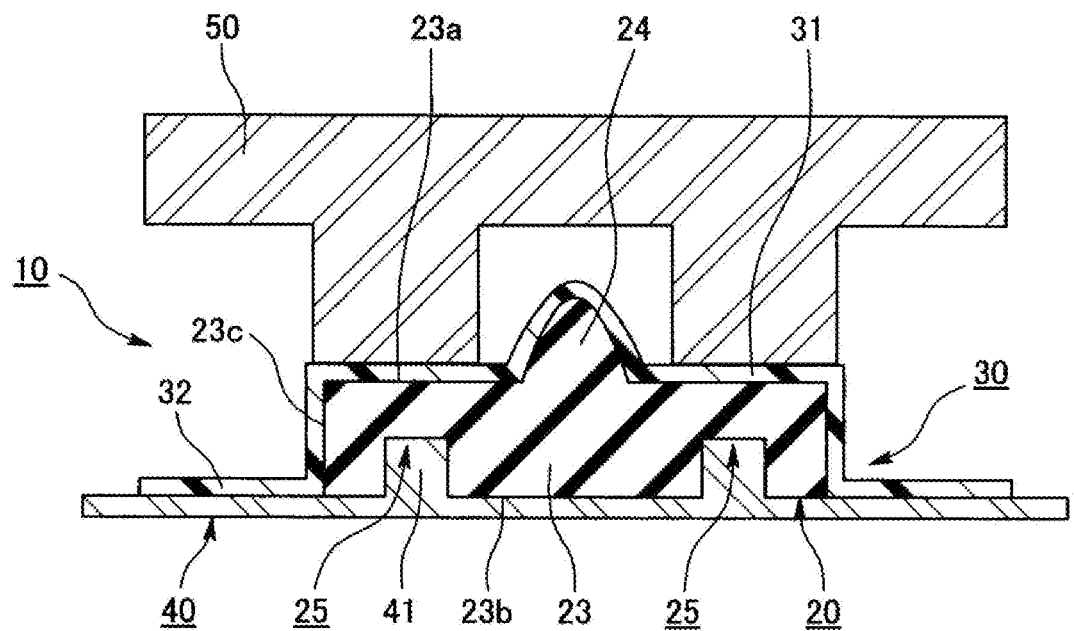
Figure 3B:
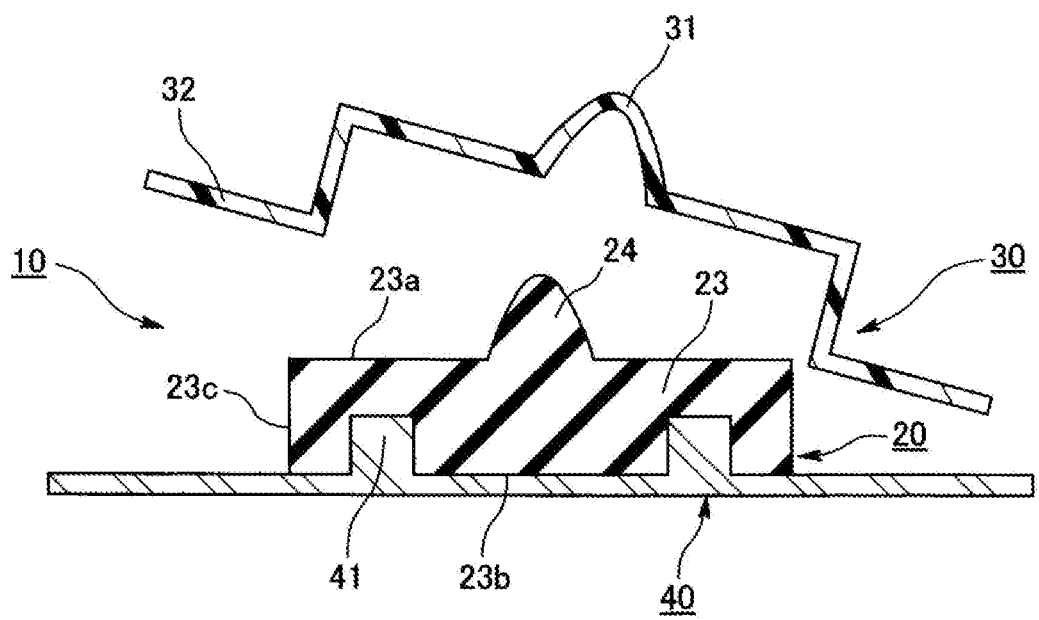

Next, a method for mounting the gasket 10 according to this embodiment is described with reference to the drawings. FIGS. 3*a* and 3*b* are explanatory views illustrating a method for mounting the gasket 10 according to the embodiment of the present invention, in which FIG. 3*a* is a view illustrating a state where the gasket 10 is fixed to the separator 40 and FIG. 3B is a view illustrating a state where the carrier film 30 is separated from the gasket body 20.

First, positioning is performed so that the recessed portions 25 formed in the other surface 23*b* of the seal base portion 23 in the gasket body 20 and the projection portions 41 formed in the separator 40 are arranged on the same line as illustrated in FIG. 3*a*, and then the one surface 23*a* side of the gasket body 20 (outer surface of the carrier film 30) is pressed by a pressing jig 50. Then, the recessed portions 25 formed in the other surface 23*b* of the seal base portion 23 in the gasket body 20 are press-fitted into the projection portions 41 formed in the separator 40, so that the recessed portions 25 and the projection portions 41 are engaged with each other. Thus, the gasket body 20 is firmly mounted (fixed) in the separator 40.

Next, the carrier film 30 is separated from the gasket body 20 by tearing off, for example, the carrier film piece 32 in the carrier film 30 stuck to the gasket body 20 as illustrated in FIG. 3*b*. At this time, the gasket body 20 is firmly mounted in the separator 40, and therefore the gasket body 20 is not removed from the separator 40 when the carrier film 30 is separated. Thus, the carrier film 30 is easily and stably separated from the gasket body 20. In addition thereto, the gasket body 20 is stacked by laminating the separator 40 and the like while being firmly mounted in the separator 40.

As described above, the gasket 10 according to this embodiment is brought into the combined state in which the gasket body 20 is held by the carrier film 30 and products can be conveyed, stored, and the like in the combined state. Therefore, a twist or the like is hard to occur in the gasket body 20 held by the carrier film 30, and thus the workability can be further improved than that in a case where the gasket body 20 alone is handled.

Moreover, according to the gasket 10 of this embodiment, the recessed portions 25 formed in the other surface 23*b* of the seal base portion 23 in the gasket body 20 and the projection portions 41 formed in the separator 40 are engaged with each other, whereby the gasket body 20 is firmly mounted in the separator 40. Therefore, the carrier film 30 in the gasket 10 can be stably separated from the gasket body 20.

Moreover, a procedure for separating the carrier film 30 from the gasket body 20 according to this embodiment includes only tearing off the carrier film piece 32 in the carrier film 30 after the gasket body 20 is mounted in the separator 40. Therefore, an operation of removing the gasket body 520 by the suction jig 553 after the carrier film 530 is fixed with the adsorption portion 552 in the evacuation device 551 as in the gasket 510 in reference examples illustrated in FIGS. 7*a* and 7*b* and FIGS. 8*a* and 8*b* may not be performed. Therefore, the carrier film 30 can be easily separated from the gasket body 20.

Moreover, the gasket body 20 in the gasket 10 according to this embodiment is firmly mounted in the separator 40 also after the carrier film 30 is separated, and therefore the positional shift of the gasket body 20 in stacking does not occur.

Moreover, the gasket 10 according to this embodiment is free from the necessity of separating the carrier film 30 before the gasket body 20 is mounted in the separator 40. Therefore, the process of mounting the gasket body 20 in the separator 40 and the process of separating the carrier film 30 from the gasket body 20 can be almost simultaneously performed.

In other words, the above-described matter means that the recessed portions 25 formed in the gasket body 20 and the projection portions 41 formed in the separator 40 have both a function of fixing the gasket body 20 when separating the carrier film 30 and a function of preventing the positional shift of the gasket body 20 in stacking after separating the carrier film 30.

The invention claimed is:

1. A gasket comprising:
   an elastic gasket body; and
   a removable carrier film attached to one surface in a thickness direction of the elastic gasket body,
   wherein the elastic gasket body includes a pair of recesses formed in another surface of the elastic gasket body that is opposite to the one surface in the thickness direction of the elastic gasket body, the pair of recesses being located at positions that correspond to a pair of projections that are formed on a member to be sealed with the gasket,
   the pair of recesses are configured to receive the pair of projections, and
   the pair of recesses each have a depth that is less than a thickness of the elastic gasket body.

2. The gasket according to claim 1, wherein
   the pair of recesses extend along an entire periphery of the elastic gasket body.

3. The gasket according to claim 1, wherein
   the pair of recesses are spaced apart and parallel to one another.

4. A method for mounting the gasket according to claim 1, comprising:
   mounting the elastic gasket body on the member to be sealed by engaging the pair of recesses with the pair of protections that are formed on the member to be sealed, and then separating the carrier film from the elastic gasket body.

5. A method for mounting the gasket according to claim 2, comprising:
   mounting the elastic gasket body on the member to be sealed by engaging the pair of recesses with the pair of projections that are formed on the member to be sealed, and then separating the carrier film from the elastic gasket body.

6. A method for mounting the gasket according to claim 3, comprising:
   mounting the elastic gasket body on the member to be sealed by engaging the pair of recesses with the pair of projections that are formed on the member to be sealed, and then separating the carrier film from the elastic gasket body.

\* \* \* \* \*